(12) United States Patent
Clive-Smith (10) Patent No.: US 7,402,013 B2
(45) Date of Patent: Jul. 22, 2008

(54) DEMOUNTABLE DRIVE

(76) Inventor: Martin Clive-Smith, Wootton Paddox, Leek Wootton, Warwickshire (GB) CV35 7QX ( * ) Notice: Subject to any disclaimer, the term of this patent is extended or adjusted under 35 U.S.C. 154(b) by 389 days.

(21) Appl. No.: 10/546,571

(22) PCT Filed: Feb. 27, 2004

(86) PCT No.: PCT/GB2004/000798
§ 371 (c)(1),
(2), (4) Date: Aug. 23, 2005

(87) PCT Pub. No.: WO2004/078632
PCT Pub. Date: Sep. 16, 2004

(65) Prior Publication Data
US 2006/0182508 A1    Aug. 17, 2006

(30) Foreign Application Priority Data
Mar. 3, 2003  (GB) ................... 0304780.0

(51) Int. Cl.
*B60P 7/00* (2006.01)
(52) U.S. Cl. .......................... 410/24; 410/26

(58) Field of Classification Search ............ 410/4, 410/24, 26, 29.1; 414/495, 540; 187/251, 187/252; 105/370
See application file for complete search history.

(56) References Cited

U.S. PATENT DOCUMENTS

| 2,278,817 A | 4/1942 | Werner |
| 4,801,229 A | 1/1989 | Hanada et al. |
| 5,528,860 A | 6/1996 | Clement |
| 5,775,858 A * | 7/1998 | Bacon ............... 410/26 |

FOREIGN PATENT DOCUMENTS

| EP | 0518795 | 12/1992 |
| EP | 0776786 | 6/1997 |
| WO | WO95/29311 | 11/1995 |

\* cited by examiner

*Primary Examiner*—Stephen Gordon
(74) *Attorney, Agent, or Firm*—Galbreath Law Office, P.C.; John A. Galbreath

(57) ABSTRACT

A container (40) has a movable internal load support, such as a deck platform (15), with a demountable motorised drive (10), and a transfer drive, such as a threaded shaft (16), mounted within a deck chassis, with shaft runners or travellers (17, 27) connected to a cable suspension (18, 22), in turn running over transfer pulleys (19), mounted upon the platform and an external support, such as a container frame.

13 Claims, 7 Drawing Sheets

DEMOUNTABLE DRIVE

This invention relates to so-called 'demountable drives', and is particularly, but not exclusively, concerned with demountable drives for transport and loading facilities.

As such it applies to movable load decks, support platforms, ramps or racks in containerised transport and storage.

An example is internal load and/or load deck manoeuvring, such as to adjust elevation, inclination or tilt, and relative disposition to other elements or structures.

With appropriate provision, load packing and stacking can be undertaken, along with relocation of load supports to an unobtrusive rest or parked position, say to allow maximisation of internal load space.

A particular load instance is a road vehicle, which represents a valuable and vulnerable cargo—and one for which drive-on/off load deck tilt and level adjustability is useful.

Whilst such facilities are desirable in bolstering operational capability, their configuration as permanent on-board installations has cost implications.

For example, drive motors themselves can cost several hundred pounds—yet are used only occasionally in (un)loading.

Motor service life, vulnerability to corrosion (on long sea voyage) and ongoing maintenance, safety inspection and certification are other cost considerations.

Taken over a container fleet, this represents a prohibitive expense—whether in original (OEM) build, or as a container conversion.

It would thus be desirable if a common (portable) drive motor, say based at an (un)loading station, could be used over a fleet of containers.

Terminology—Demountable

The term 'demountable' embraces a facility for selective (dis)connection or (dis)engagement and a certain mobility, for installation and removal, say, to allow temporary relocation to operate another facility.

Terminology—Drive

The term 'drive' is used herein to embrace diverse displacement facility for imparting movement—whether distinct from, or integrated with, a power source, whether, say, electrical, (electro)magnetic, pneumatic or hydraulic.

Generally, for powered or motorised facilities, a permanent on board facility represents an adverse cost and weight penalty—which can represent a significant proportion of total cost and weight—so inhibiting adoption and reducing payload.

Moreover, a fixed or permanent on-board drive installation is somewhat inflexible.

Hence the rationale of some mobile—desirably personally portable—external power or rather drive or motor provision.

Terminology—Motor

The term 'motor' is used herein to embrace diverse (prime or secondary mover) actuator character, nature, configuration or provision—ie whether rotary, arcuate or linear, continuous, intermittent, unidirectional, bi-directional or reversible.

A prime example is a rotary drive, such as electrical, hydraulic or pneumatic powered.

This allows a trailing umbilical feed from a remote power source to a mobile station.

STATEMENT(S) OF INVENTION

According to the invention,
a movable load support platform or deck (15),
is configured for coupling to a demountable drive motor,
and incorporates a motion transfer drive.

According to another aspect of the invention,
a demountable drive,
is configured for a load support platform (15),
movable within a transport and storage container;
the drive comprising
a portable motor or actuator (11),
a detachable coupling (12, 14),
a drive transfer mechanism (16),
such as a screw shaft,
incorporated in the platform,
with support elements,
such as a cable and pulley array,
between platform and container.

In practice, a motion transfer drive,
could comprise a screw shaft (16),
incorporated within a hollow deck chassis (15);
one or more runners or travellers (17, 27),
mounted upon the drive (shaft),
and connected to a cable suspension (18, 22),
in turn run in transfer pulleys (19),
disposed in the deck chassis;
and a support structure,
such as a container 40 frame or body,
an inset gantry or side support posts.

A load support may be dedicated to a particular load category
a prime example being a (road) vehicle,
for containerised vehicle transport and storage.

Load stacking can be achieved with movable load supports, to allow a load element, such as an individual vehicle, partially or wholly to underlie another, itself suspended overhead.

Drive motor rated power is sufficient for both load support and payload.

Provision for load support movement itself adds a weight and cost penalty—which would be aggravated if the drive were a permanent on-board installation.

Thus, conveniently, the drive is portable, such as a hand-held motor—somewhat akin to a power tool, with support and bracing handles and a trigger button ON/OFF and/or (electronic) variable speed control switch.

Whilst external power is envisaged, if not available as in remote locations, a drive motor could be self-contained, such as a battery-powered electric motor, or run from a portable generator or an on board generator and/or battery required for other purposes, such as independent back-up lighting or refrigeration.

A suitable proprietary portable motor is the so-called Super-Hawg model, with handle grip re-locatable between drill body sides—available per Milwaukee Drills.

A quick release, snap-action, or automatic drive-on/reverse-off, drive coupling could be employed.

A rotary drive imparts a rotary motion to load support (re-)positioning facilities, and which in turn can be converted into other motions, such as linear.

Such motion conversion may be undertaken, by bespoke mechanism, internally within the load support facility.

A rotary motion may be continuous, variable speed, intermittent or incremental—say between extreme motion limits or attendant mechanism travel, under operator control.

Intervening index positions may subdivide a mobility range, for rapid transit to a predetermined position.

A drive motor (temporary) support cradle or carriage may be provided to ease operator burden.

Such a cradle could be fixed or movable.

Thus, a portable motor could be temporarily suspended, say in a sling or harness, from an overhead gantry or container deck or roof beam.

Generally, an operator positioned at a drive station is well-placed to observe and control motion, and to adjust drive accordingly from a safe standpoint clear of the load.

Thus precise and small incremental load adjustment may be effected with the operator close at hand.

Travel limit and/or load contact warnings may be employed as operator guidance.

Automatic shut-off trips may be used to Inhibit drive at extremes of mechanical travel and/or upon over-load.

This is important for expensive and vulnerable loads such as vehicles.

The drive may incorporate a (reduction) gear box, to deliver appropriate torque and (rotary) speed.

A motion limiter or over-run inhibitor or brake may be installed in the drive chain, against unwanted load deck movement—such as under load deck weight—when uncoupled from a drive motor.

Drive Transmission—Gearbox

A single, multiple speed or infinitely-variable (eg variable diameter pulley and belt), gearbox may be employed.

The motor or gearbox may also feature a flywheel to maintain drive momentum.

A clutch for selective drive disengagement may also be fitted—and could be triggered upon overload.

The gearbox may include a reverse ratio, or drive reversal may be achieved in the motor itself, such as by changing electrical connections.

A drive motor could feature an integral gearbox and drive transfer, to allow power take-off at different orientations relative to one or more hand holds.

To this end, a split motor body and output gearbox may be employed—with, say, a quick-release coupling to facilitate relative position adjustment.

A prime drive configuration is a portable hand drill, with a detachable drive coupling, whether a chuck, drive spigot or socket, in turn powered by a self-contained re-chargeable battery, or external supply, via an umbilical power cable link or fly lead.

Alternatively, a fluid (pneumatic or hydraulic) motor may be employed.

A compact high torque, high power, variable speed electric (drill) motor power and speed range could be adopted.

Drive Offset

A drive motor would desirably feature an angled and/or offset drive enabling improved reach and access with greater side wall working clearance without need for a costly universal joint, with attendant losses and potential irregular drive transmission.

Trolley Drive

Conveniently, a load deck could be fitted with ground running wheels, to serve as a mobile load trolley—powered by a shared lift and tilt adjustment drive motor.

An end drive coupling would allow drive motor positioning at one end, so an operator need not stand beneath the load deck—an operator safety consideration.

Moreover, a single-ended drive location and coupling could be employed to lift either or both front and/or rear load deck ends, through a drive transmission in the deck.

Generally, a drive motor could be coupled to any of a:
drive transfer screw
hydraulic pump
gearbox to other systems
winch to a wire or chain suspension
a lifting frame
a container roof mounted winch or transfer screw A drive transfer mechanism is conveniently incorporated within a load deck, platform or ramp.

One drive transfer configuration comprises:
a rotary (spiral threaded) drive screw,
with a movable traveller, runner or carrier,
in turn coupled to a drive cable,
running around pulleys,
to a support reaction point in a container frame, strut insert or chassis,
configured selectively to draw in or pay out cable,
and so adjust drive screw,
and attendant platform disposition within a container.

Internal Friction

Internal friction within the overall mechanism may be sufficient passively to inhibit movement when the external drive is inoperative.

Detent

That said, safety detents, latches or locks may be fitted positively to restrain unwanted movement.

Such detents may be power-actuated and triggered in conjunction with drive enabling or initiation.

'Cable' Suspension

A continuous cable run may transfer lift between reaction points on a container frame.

In a particular construction, drive shafts are fitted at opposite sides of a load support platform, such as within individual vehicle (wheel) ramps, and are coupled to a cable (ie rope, wire, chain, belt or strap) and pulley arrangement transferring suspension loads to a container roof and/or internal support frame or gantry.

The cable suspension can inter-couple the platform sides, for balanced movement and positional adjustment—preserving level (or prescribed tilt) between those sides.

A suspension cable could be fitted at or adjacent each platform corner.

Corner attachment allows corrective adjustment to the platform support plane, to keep it 'squarely' aligned within a container internal profile and reduce risk of jamming.

Hollow Deck

A drive shaft, shaft runners and cable run could be fitted within a hollow platform deck beam profile, such as a 'U' or 'C' section chassis beam, preserving access for maintenance and repair.

Differential Sided Drive

Conveniently, a drive shaft on one side could be used for platform elevation, and a drive shaft on the other side for platform lowering—that is effectively an UP SIDE and a DOWN SIDE respectively for WIND UP or WIND DOWN.

According to propulsion employed, power could be supplied through an electrical cable, pressurised air line or (hydraulic) oil feed.

Single/Double Ended Drive

This could be repeated at opposite platform ends, for platform levelling or tilt.

Alternatively, all drive could be taken at one end.

The respective shaft thread sense or orientation can allow these functions with a common motor drive direction—ie without need for motor reversal—which is convenient when making continual fine adjustment for precise load positioning.

Drive shaft thread pitch allows precise, but rapid, adjustment.

A drive coupling or interface at a corresponding (say, forward and/or rearward) end of each shaft allows selective attachment of a demountable drive motor, with attendant controller.

With separate cable suspension at opposite ends and selective coupling to drive shaft runners or travellers, platform ends could be raised or lowered independently.

Multiple, in particular dual or twin, drive shafts could be employed for such independent platform end positioning.

Multiple shafts could be disposed one above the other and/or alongside one another, for compactness of installation within a hollow deck chassis.

Shafts could be mounted, say at or adjacent their ends for freedom of traveller movement, in support bearings secured to chassis frame members.

Other shaft arrangements and dispositions include transverse mounting, such as in a cradle between opposite wheels of a vehicle load.

Overhead shaft disposition, say in a container roof, instead of, or in addition to a load support platform, could be contemplated, subject to preserving ready access for demountable drive coupling.

Similarly, upright shaft disposition, say alongside a container wall, might be contrived.

A (screw) shaft provides a certain (reduction) transfer gearing according to screw thread pitch.

This gearing may be combined with, or substituted in whole or part by, mechanical advantage, contrived through a multiple pulley array.

Cable suspension could be used primarily for (elevation) positioning, with supplementary (rigid) suspension links, hangers or struts to hold a platform once brought to a desired position.

A releasable connection, such as a clip-joint, may also be fitted between suspension cables and load platforms, to allow selective (de-)mounting.

Provision may also be made for interconnecting platforms to allow stacking.

Multiple independent sets of suspension cables may be employed to allow independent platform lift into a desired relative disposition.

Deck Parking

Once positioned, deck platforms could be 'parked', say secured to a container wall, (lateral) support frame or side post, and/or inter-coupled, to allow re-deployment of at least some suspension cables.

Thus multiple platform handling within a common container could be undertaken.

Individual platforms could be fitted with deck runners or wheels, to allow (re-)location and alignment with cable suspension points.

Visual markings or detents could be used to facilitate such mobile platform positioning.

Suspension cables could themselves be carried upon runners in tracks mounted upon a container roof or internal support frame, to allow longitudinal and/or transverse adjustment.

Container—Load Support—Drive Interface

Another aspect of the invention provides a container with a movable internal load support, fitted with an interface or coupling for demountable drive.

Motor Parking

A motor mounting and coupled deck drive could be fitted to receive a 'parked' or docked drive motor only when required.

This would ease portability and free an operator to move around the container to monitor movement.

A light gauge umbilical cord, coded radio or Infra Red link could be retained to operator control over the 'parked' drive motor.

(Re-) Movable Load Support

Yet another aspect of the invention provides a (re-) movable load support, such as a platform, for installation in a container, and fitted with an interface, or coupling, for a discrete demountable drive.

Whilst demountable drive interconnection is conveniently made at platform ends, in principle, interaction could take place intermediate the ends, and/or from one side.

An example would be through provision of, say, an offset gearbox or worm gear, to a winder shaft set transversely of the primary drive transfer shaft.

Multi-Role Motor and/or Drive

A drive motor could be used for deck platform mobility generally, including use as a mobile trolley for lateral transit.

EMBODIMENTS

There now follows a description of some particular embodiments of the invention, by way of example only, with reference to the accompanying diagrammatic and schematic drawings, in which;

Thus, more specifically:

FIG. 2A shows a twin, selectively inter-coupled, shaft arrangement, with respective runners secured to a common cable suspension, for co-operative powered lift or lowering action, under single demountable drive motor, coupled to an end of one shaft, as in FIG. 1; the shafts being depicted with drive transfer gears at one end disengaged;

FIG. 2B shows the arrangement of FIG. 2A, but with shafts inter-coupled, by inter-engagement of respective end transfer gears;

Thus, more specifically:

FIG. 3A shows a 3-D perspective view of the arrangement of FIG. 2A with a cable drive to opposite sides of a lift environment, such as a load deck within a container; a demountable drive being coupled to an end of one shaft, the shafts being depicted with drive transfer gears at both ends engaged;

FIG. 3B shows the arrangement of FIG. 3A, but with shaft uncoupling by dis-engagement of transfer gears at one end;

Thus, more specifically:

FIG. 4A shows a load—in this case a vehicle—upon a mobile load support platform mounted upon running wheels upon a container deck, with another vehicle load suspended by cable slings to its underlying platform from the container roof, allowing differential end lift and so platform and vehicle tilt;

FIG. 4B shows level elevation and lowering of longitudinally-spaced load support platforms, again by respective cable suspension from a container roof;
- with drive following the scheme of FIG. 1 etc, albeit not detailed;
- and intervening longitudinal (optionally motorised) displacement of another load platform running upon the container deck;

FIG. 4C shows stacking of empty deck platforms for return-empty transport and storage, again with a common cable lift being utilised to draw successive underlying platforms into a stack from below;

FIG. 4D shows individual deck platform adjustment by an operator applying a demountable drive to and interface of coupling one deck end; again allowing platform elevation or lowering, level or tilted;

Thus, more specifically:

FIG. 5A shows a load platform running upon a container deck, for alignment with overhead cable suspension;

FIG. 5B shows coupling of the aligned platform of FIG. 5A to the cable suspension;

FIG. 5C shows elevation of the coupled platform of FIG. 5B, by operation of the cable suspension—such as by an operator with demountable drive, as depicted in FIG. 4D;

Thus, more specifically:

FIG. 7A shows a cut-away perspective view of an individual load support platform, such as a cradle for opposed wheels of a vehicle load, as shown in FIG. 7B;

FIG. 7B shows a longitudinal cut-away view of a container with vehicle loads upon respective wheel cradles, each with transversely disposed transfer shafts as shown in FIG. 7A, allowing adjustment of vehicle fore and aft inclination or tilt;

More specifically:

FIG. 11A shows a cradle pulled out from a deck internal recess ready to receive a demountable drive motor;

FIG. 11B shows a motor installed in the deployed cradle of FIG. 11A and coupled to a drive transfer coupling at one deck end.

REFERRING TO THE DRAWINGS

Figure 1:
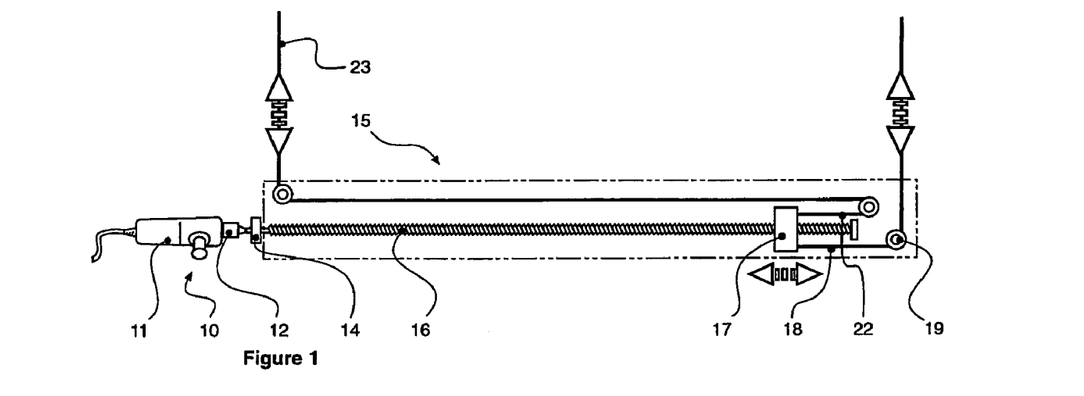
FIG. 1 shows a longitudinal sectional view of a movable load support platform, with a (screw shaft) transfer drive for connection to a demountable drive; a corresponding arrangement may be used at each platform side for balanced support and adjustment.

In FIG. 1 a hollow platform deck 15 incorporates a drive transfer mechanism configured as a (spiral threaded) screw shaft 16.

A coupling 14 at one end of the shaft emergent from the platform is accessible to a demountable drive 10, configured as a portable motor 11 with a coupling 12.

A traveller or runner 17 is carried by the shaft 16 and coupled to suspension cables 18, 22, running around a series of pulleys 19.

Pulleys 19 are disposed for directional transfer—that is to route longitudinal movement, alongside shaft 16, to upright or vertical limbs, in turn secured to a support (see FIGS. 4A through 4D).

A detachable connection (not shown) may be fitted between cables and suspension points.

This could be a simple hook and eye connector, or more elaborate clip and latching restraint, for security of load entrainment.

Corresponding detachable connection (again not shown) could be fitted between platform and cables—such as to allow platform relocation of FIGS. 4A through 4D.

Cables 18, 22 run initially parallel to the shaft 16 from a common runner 17 at one end.

Additional runners, or cables could be employed.

Thus, for example, multiple runners, with the same or opposite sense of thread actuation may be fitted to a common shaft, for co-operative corresponding or opposed movement.

Cables could be allotted dedicated runners.

Cable 18 is turned upward into upright or vertical limb 21, whereas cable 22 is returned back alongside shaft 16 to the opposite end and there turned upward into upright or vertical limb 23.

Double-headed arrows indicate the bi-directional mobility of cable 18, 22 movement.

Pulley and cable configurations could provide mechanical advantage or velocity ratio change.

The shaft 16 thread pitch can also provide an internal drive gearing reflecting load lift and speed of operation considerations.

Disposition—Elevation & Tilt

Shaft 16 rotation, driven by motor 11, moves the runner 17 longitudinally along the shaft 16—in one direction or the other according to rotational direction—and draws cable 18 along with it, in order to adjust platform 15 disposition.

The platform 15 internal drive transfer is thus rotary to linear.

Disposition, includes height and (longitudinal) inclination or tilt, by differential movement of platform 15 ends.

Lateral tilt could be effected by differential movement of platform 15 corners, through adjustment of drive transfer at opposite sides.

The motor 11 is configured as a portable hand-held power tool, partially supported at one (forward) end, once couplings 12, 14 are secured.

Torque reaction to the motor 11 drive is resisted by operator stance, but a sliding index pin (not shown) could be incorporated in the coupling.

Restraint (Lateral) restraint ties or safety chains (not shown), can be fitted between load platform 15 and container support frame.

Similarly, a backup 'fall limit' tie may be employed in case of primary (cable support) failure.

Passive Motion Restraint

Generally, it is envisaged there will be sufficient internal friction to inhibit unwanted motion and load deck movement upon uncoupling a demountable drive motor.

That is 'passive motion restraint' is inherent in a drive transfer screw.

Nevertheless, an active limiter, mechanical latch or releasable stop may be fitted to the drive, positively to inhibit movement absent active drive.

Drive Reversal

Drive reversal can be undertaken simply by motor 11 reversal.

Alternatively, with transfer shafts set at opposite sides of the platform 15 (a configuration not shown) and respective threads orientated accordingly, one shaft can be used for one drive direction, such as elevation or UP, and the other shaft can be used for the opposite drive direction, vis lowering or DOWN.

Figure 2A:
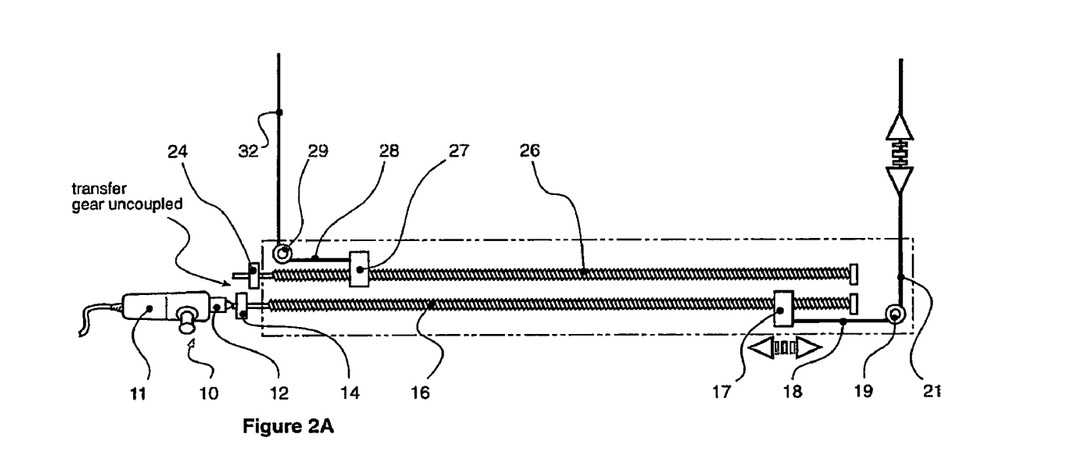
FIGS. 2A and 2B show variant configurations of FIG. 1, with multiple (in this case overlaid) drive transfer shafts at one or both sides.
Figure 2B:
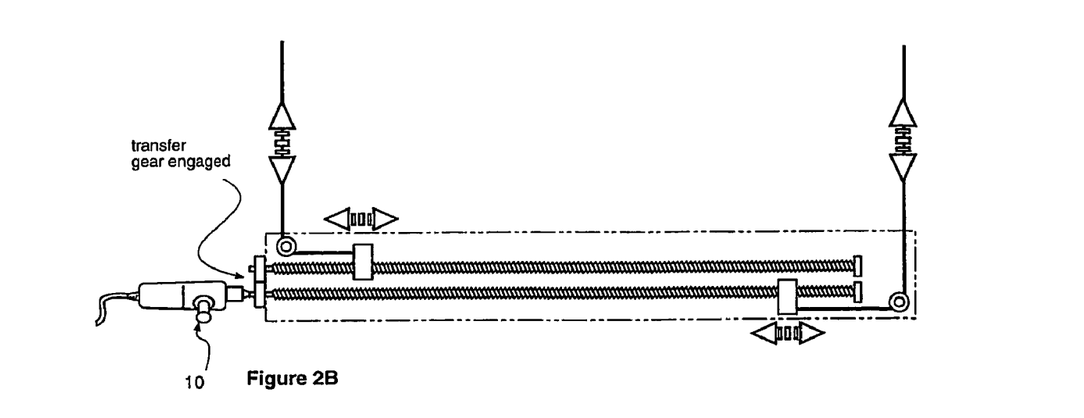

FIGS. 2A and 2B show a multiple—in this case dual—drive transfer shaft arrangement.

Thus a shaft 16 is configured generally, as in FIG. 1, except that runner 17 carries only a single cable for one end of platform 15—the other end being addressed by an additional transfer shaft 26.

For ease of illustration, shafts 16, 26 are depicted juxtaposed one above the other, but could be laterally and/or vertically offset.

The additional shaft 26 carries its own runner 27 coupled to a dedicated cable 28 running around transfer pulley 29 to an upward limb 32, supporting the opposite end of platform 15 from cable limb 21 associated with shaft 16.

Respective couplings 14, 24 upon corresponding ends of shafts 16, 26 provide interfaces for a common demountable drive 10, and also allow shaft 16, 26 inter-coupling, so that drive to one is transferred to the other.

When uncoupled, drive to one or other shaft 16, 26 affects the associated end of platform 15.

If inter-coupled, drive to either shaft 16, 26 affects both shafts equally and moves both ends of platform 15 similarly—so that platform inclination or tilt remains unchanged.

That is, if 'level' initially, the platform 15 remains level.

Similarly, if tilted at the outset, platform 15 remains tilted by the same amount.

Runners 17, 27 are shown at start positions at or adjacent respective shaft 16, 26 ends, leaving a substantial shaft length available for runner travel and in turn a substantial range of cable movement and attendant platform end rise or fall.

As reflected in FIGS. 4A through 4D, it is desirable to provide for platform 15 lift over full load space availability.

FIGS. 1 and 2A, 2B address drive transfer and platform 15 lift at one side.

Figure 3A:
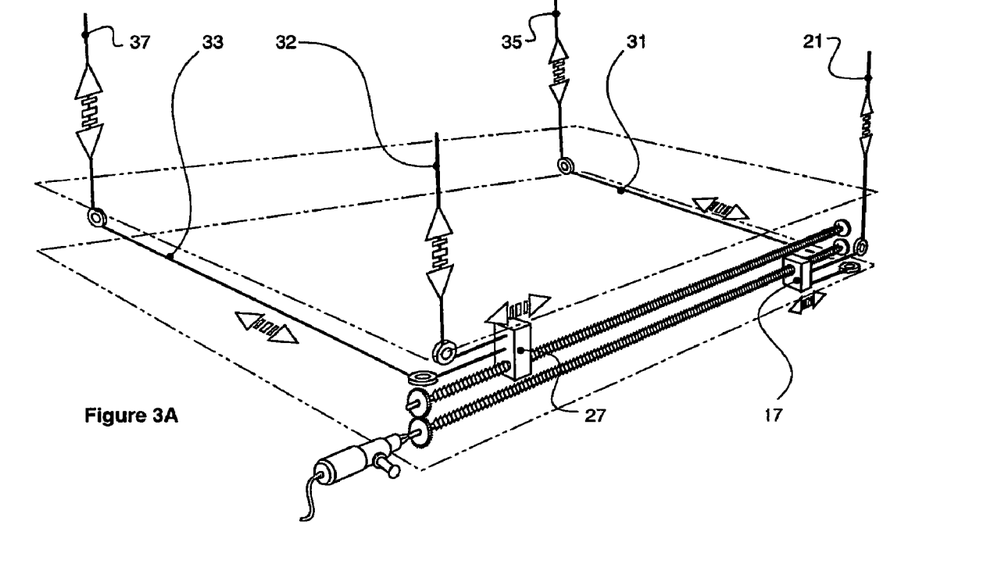
FIGS. 3A and 3B show perspective views of a drive such as of FIGS. 2A and 2B, configured for double-sided operation, with selective shaft coupling by inter-engagement of end drive transfer gears.
Figure 3B:
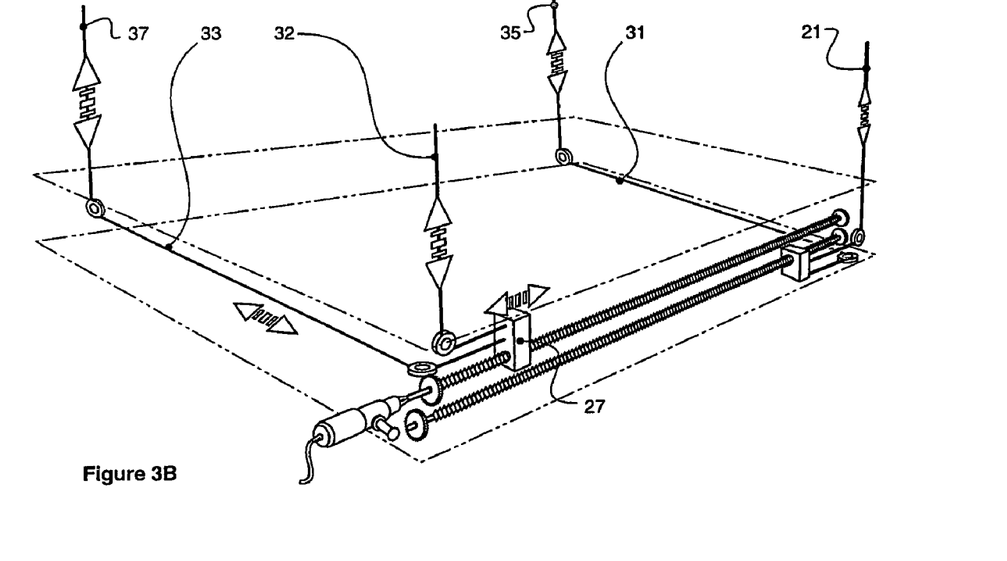

Corresponding provision may be made at the other side, or a cable transfer arrangement, such as of FIGS. 3A and 3B may be employed.

Thus from the multiple shaft configuration of FIGS. 2A, 2B, additional transfer cable runs 31, 33 are taken from respective runners 17, 27 transversely and thence to upward limbs 35, 37.

FIGS. 4A through 4D show load support platform disposition adjustment, such as of FIGS. 1 through 3B, to a container 40.

Figure 4A:
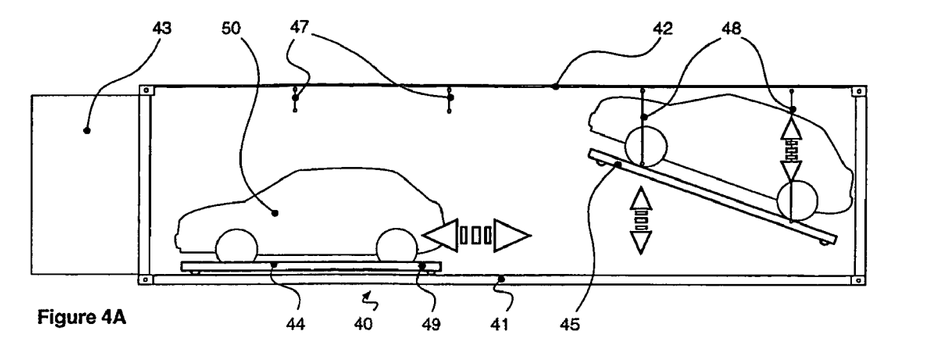
FIGS. 4A through 4D show (un)loading sequences, with attendant load (re-) disposition, embracing elevation, tilt and lowering, along with transverse or lateral translation or displacement.

A particular load, in this instance is a vehicle 50, shown in FIG. 4A set upon an individual platform 44 mounted upon runners or wheels 49 upon a floor 41 of the container 40.

Double-headed arrows indicate platform 44 longitudinal mobility within the container 40 confines and beyond through access doors 43 at one end.

Platform 44 mobility allows its positioning in alignment with overhead suspension cables 47 from the container roof 42.

Longitudinally alongside platform 44 is another platform 45, suspended from cables 48, at a prescribed inclination or tilt, to create an underlying load space upon the floor 41, which could accommodate, say, the nose of another vehicle, or another type of load.

In this way, (vehicle) load mixing, inter-nesting and stacking could be undertaken.

Figure 4B:
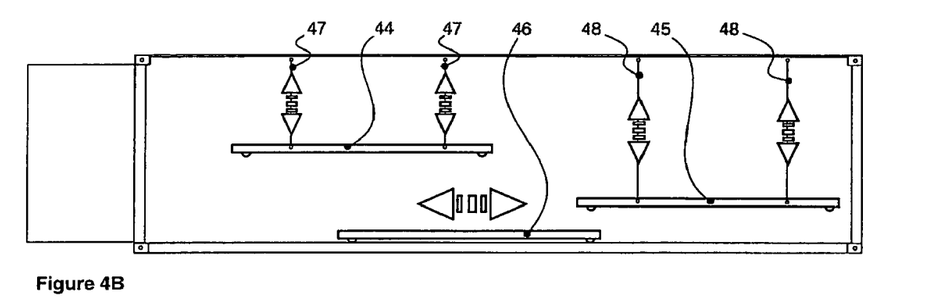
Figure 4C:
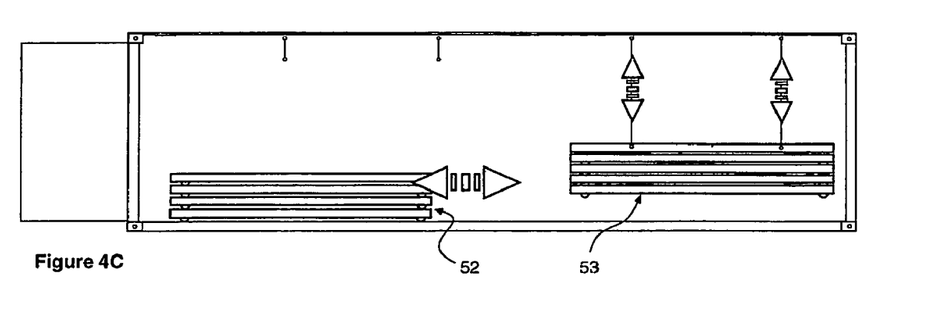

FIG. 4B shows mobility of a floor based platform 46 between suspended level platforms 44, 45, with a view to underslung suspension and stacking of empty platforms, as shown in FIG. 4C.

That is, successive individual platforms are brought, in turn, into alignment with overhead suspension cables, coupled to the cables, lifted, and secured to permanent stays (not shown).

Such stays could be additional cables, links or latching detents to a container or internal support and bracing frame.

Another platform is brought underneath a lifted platform, for repetition of the lift cycle.

Provision could be made for direct platform inter-coupling, so that cable suspension to an uppermost platform is transferred to lower underlying platforms.

FIG. 4C shows a stack 52 of empty platforms upon the floor 41 alongside a corresponding suspended stack 53.

Figure 4D:
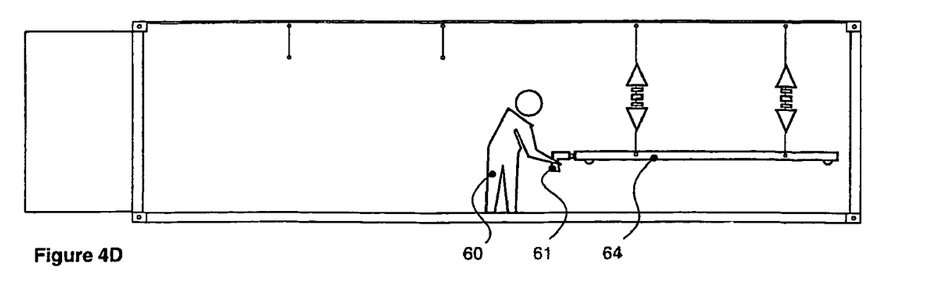

FIG. 4D shows an individual suspended platform 64 coupled to a demountable drive 61 carried by an operator 60 standing upon the floor 41.

It is apparent that the operator is well-placed to monitor platform and attendant load disposition.

Figure 5A:
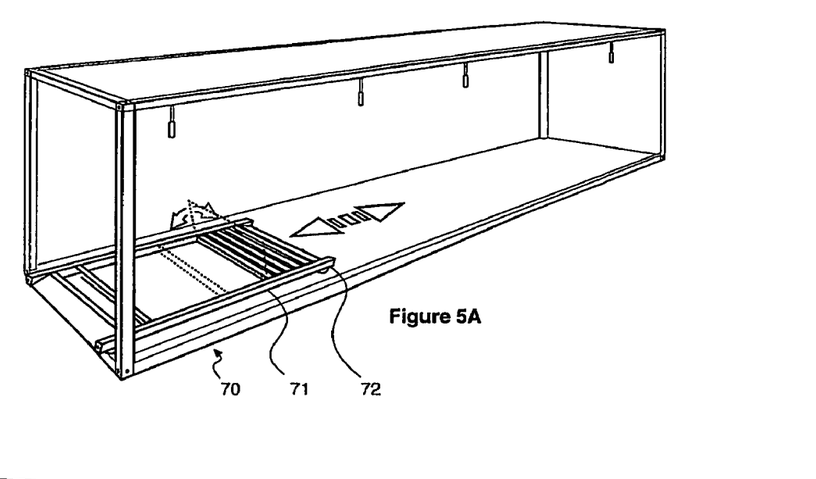
FIGS. 5A through 5C show perspective, cut-away, views of a container with movable internal load support platform, using a cable suspension and (re-) disposition facility, such as of FIG. 1; over successive stages of platform alignment, coupling and elevation by overhead cable suspension.
Figure 5B:
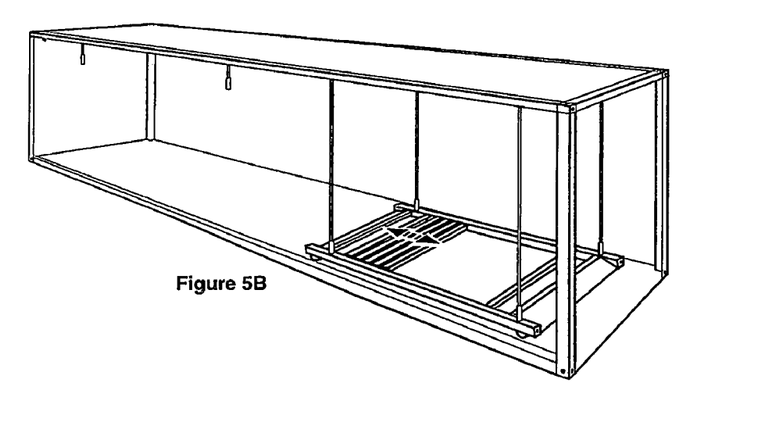
Figure 5C:
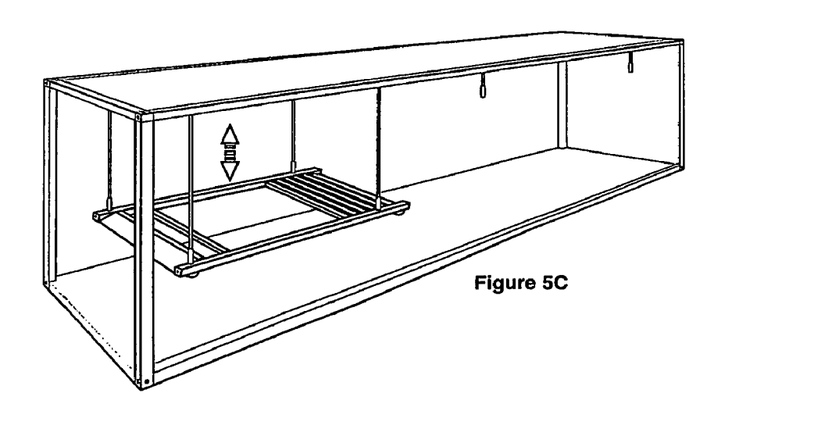

FIGS. 5A through 5C show a variant of FIGS. 4A through 4D for a container 70 with a load support platform 71 of variable configuration.

More specifically, a platform 71 is of open lattice frame construction with longitudinal runners bridged selectively by transverse beams 72.

The location and extent of platform load support surface in-fill is adjustable according to support load requirements and to allow partial intrusion of other loads to facilitate load inter-nesting and stacking.

Removable infill slats and tilting deck panels may be employed to match a load—such as a vehicle wheelbase and wheel track, whilst admitting a protruding underlying load, such as a vehicle roof.

Thus a roof of a vehicle upon the container floor could fit between wheels of an overlying vehicle, upon a platform (cable) suspended above the floor.

Figure 6:
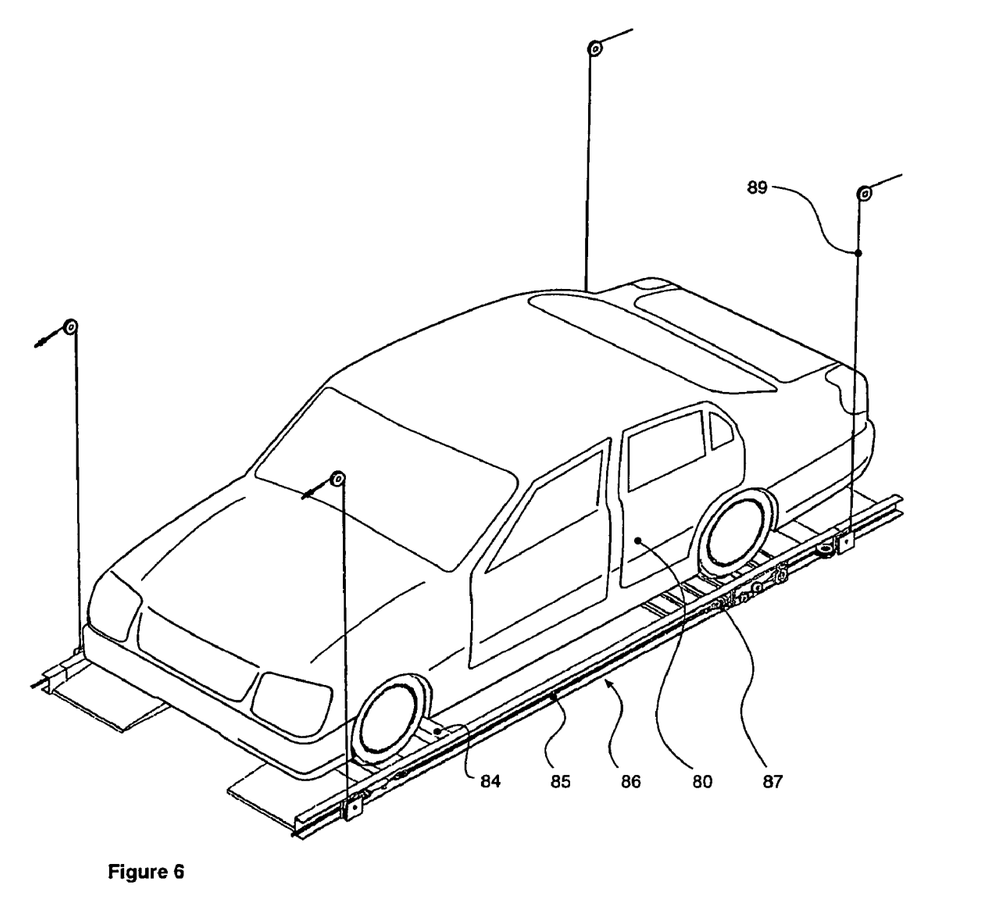
FIG. 6 shows an isometric 3-D view of a vehicle mounted upon a load support platform incorporating screw drive shaft adjustment to a cable suspension, such as of FIG. 1.

FIG. 6 depicts a fully suspended vehicle load 80 upon spaced wheel ramps 84, with infill panels for localised wheel support.

Ramps 84 are carried between longitudinal 'U'-section chassis members 85, housing respective drive transfer shafts 86, runners 87 and cables 89.

Vehicle 80 is (un)loaded by driving over the ramps 84 once the platform is resting upon a container floor (not shown).

Figure 7A:
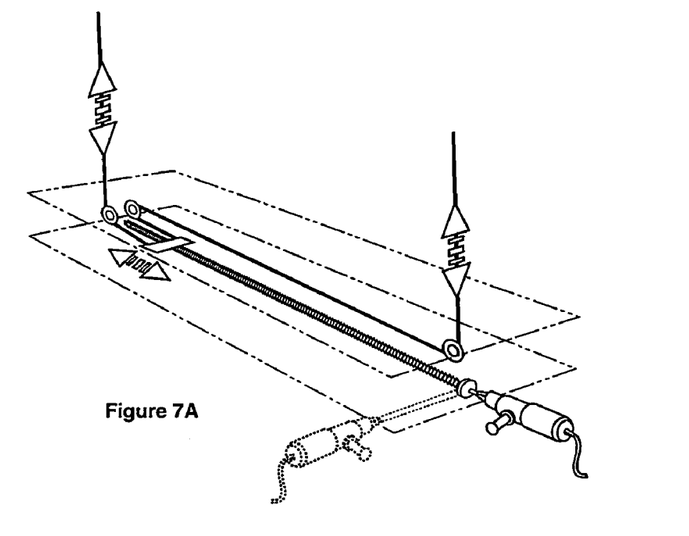
FIGS. 7A and 7B show a support platform with transversely disposed transfer shaft.
Figure 7B:
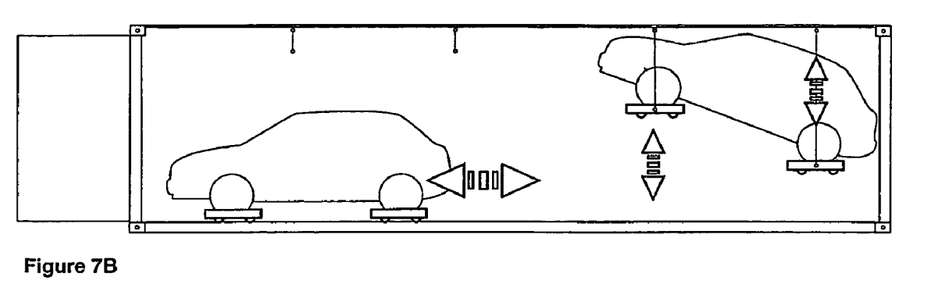

FIGS. 7A and 7B show a transversely disposed transfer shaft arrangement within individual load support platforms.

Rather than a straight aligned coupling with a demountable drive a right angled connection, shown in broken lines, could be used by fitting a transfer gearbox (not shown) to a shaft end.

This allows an operator to stand to one forward or rearward side of a platform and preserves full load platform transverse span.

Component elements correspond to those of other embodiments and are believed generally self-explanatory, so will not be detailed.

In principle, the arrangement of FIG. 7A could be inverted, with a transverse transfer shaft located in a chassis, above a (say, vehicle) load, such as in a container roof head space, and with depending cables to a load support platform or cradle.

Demountable drive access would be overhead or through a drive chain (not shown) to an access at container sides.

Drive transfer might even be in a container floor, to an emergent cable drive running up to transfer pulleys in a container roof and thence downward to a load support platform.

That said, transfer drive within a load support platform itself, represents a convenient compact format.

Figure 8:
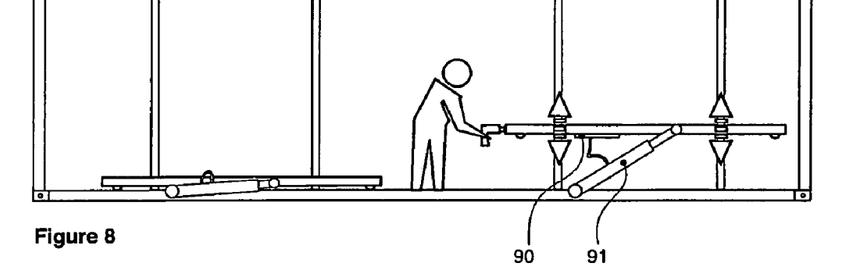
FIG. 8 shows a demountable (electric) drive motor coupled to a hydraulic pump in turn linked to remote hydraulic motors for deck platform adjustment.

FIG. 8 reflects a facility to apply a portable drive motor to charge on-board fluid (hydraulic or pneumatic) actuators, in this case struts 91, via pump 90.

Figure 9:
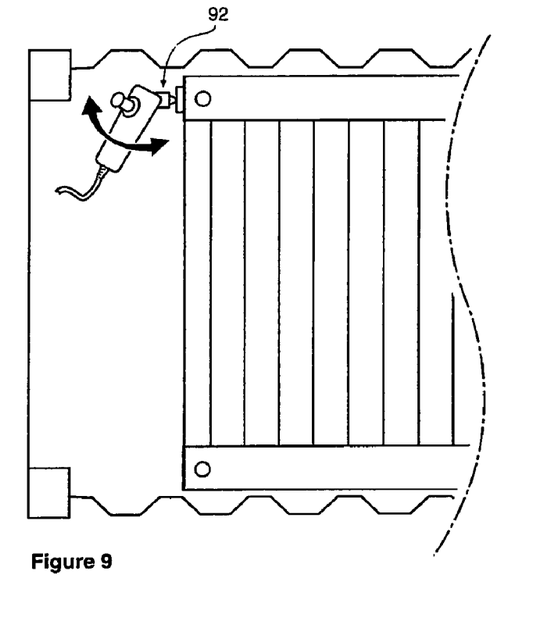
FIG. 9 shows drive motor offset and adjustable output shaft disposition, through relatively movable integrated motor and gearbox.

FIG. 9 reflects a facility to introduce drive to otherwise inaccessible pick-up points at deck platform side and corner extremities.

Thus, an angled or off-set drive coupling 92 may be employed.

Figure 10:
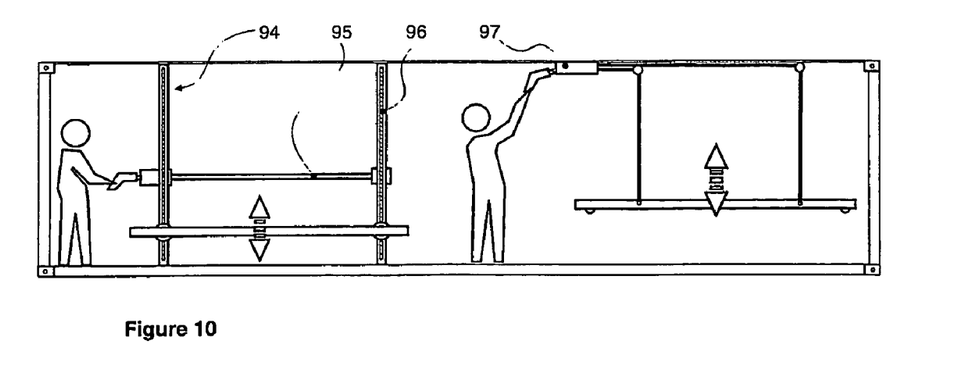
FIG. 10 shows drive to an internal lifting frame or support strut.

FIG. 10 depicts on-board transfer between inset lift struts 94 and drive application to roof-mounted actuators, such as winches 97.

Thus, struts 94 may house internal cable or chain lifts 96 connected to a drive transfer shaft 95.

Figure 11A:
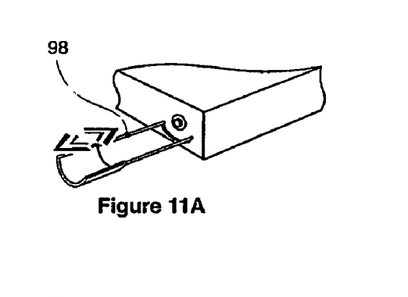
FIGS. 11A and 11B depict a pull-out support cradle for a demountable drive motor at a deck end corner.
Figure 11B:
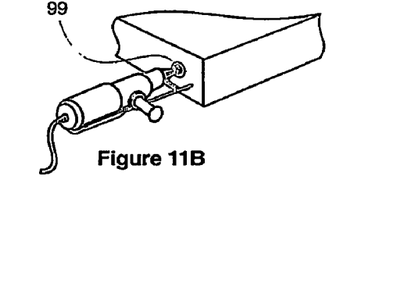

FIGS. 11A and 11B depict an optional pull-out support cradle 98 for a demountable drive motor at a deck end corner—to relieve the support burden upon an operator and to help brace torque reaction.

An operator could temporarily leave a drive station, yet the drive coupling 99 be preserved, pending operator return to help brace and supervise drive take up.

'Mix and Match' Features

Generally, in the embodiments, where feasible and appropriate, features may be selectively 'mixed and matched' to suit circumstances—albeit it is not feasible to describe every such feature combination.

Claim Layout

Bracketed words or phrases alongside claim numbering are for ease of informal reference—and so not part of claim meaning, interpretation or scope.

COMPONENT LIST 10 demountable drive
11 motor
12 coupling
14 coupling
15 platform deck
16 drive transfer shaft
17 traveller/runner
18 (suspension) cable
19 pulley
21 limb
22 (suspension) cable
23 limb
24 coupling
26 (upper) drive shaft
27 traveller/runner
28 (suspension) cable
29 pulley
31 transfer cable
32 upward limb
33 transfer cable
35 upward limb
37 upward limb
40 container
41 floor
42 roof
43 end door
44 platform
45 platform
46 platform
47 cable suspension
48 cable suspension
49 runners/wheels
50 vehicle load
52 platform stack
53 platform stack
60 operator
61 demountable drive
64 platform
70 container
71 platform
72 (re-)movable transverse deck beams
80 load
84 paired ramps
85 chassis members
86 drive transfer shafts
87 runners
89 cables
90 pump
91 strut
92 angled/off-set drive coupling
94 upright strut
95 transfer shaft
96 internal cable/chain lift
97 winch
98 cradle
99 drive coupling

The invention claimed is:

1. A movable load support platform or deck, with a severable drive motor coupling, incorporates a motion transfer drive comprising a rotary screw shaft, one or more runners or travelers, mounted upon the rotary screw shaft, and connected to a cable suspension; and a support structure, comprising a container frame or body, an inset gantry or side support posts; characterised by said transfer drive being incorporated within the movable load support platform or deck, with said cable suspension in turn run in transfer pulleys, disposed in the movable load support platform or deck.

2. A movable load platform of claim 1, with the cable suspension configured to allow deck displacement by cable sway within adjustable constraints, comprising ties or chains.

3. A movable platform of claim 1, with a plurality of motion transfer drives for different deck motions and/or orientations.

4. A movable platform of claim 1, with a plurality of severable drive motor couplings for different motion transfer drives.

5. A movable platform of claim 1, with a plurality of severable drive motor couplings at a common accessible deck end, to allow selective drive connection for desired deck movement and orientation.

6. A movable platform of claim 1, with a plurality of motion transfer drives and associated severable drive motor couplings allocated to longitudinal tilt by raising or lowering an end, and/or lateral tilt by raising or lowering a side.

7. A movable platform of claim 1, with a detachable mounting, for another deck, to allow inter-deck coupling and mounting, in a mutually overlaid stack.

8. A movable platform of claim 1, with cables in the cable suspension mounted upon the runners in a container roof or internal support frame to allow longitudinal and/or transverse adjustment.

9. A movable platform of claim 1, with the movable load support platform or deck in a parked position against the support structure in order to free cables in the cable suspension for use with another deck.

10. A movable platform of claim 1, with a support cradle for a demountable drive motor.

11. A movable platform of claim 1, with a releasable coupling between the movable load support platform or deck and cables cables in the cable suspension.

12. A movable platform of claim 1, with removable deck elements, upon an open-lattice framework, allowing selective local infill, in order to support road vehicle wheels, whilst preserving between wheel load depth, to accommodate an underlying vehicle, with a roof of the underlying vehicle disposed between front and rear wheels of an overlying vehicle.

13. A movable platform of claim 1, fitted within a freight container.

* * * * *